(12) United States Patent
Barker et al.

(10) Patent No.: US 9,552,751 B1
(45) Date of Patent: Jan. 24, 2017

(54) LIGHT TOWER MARKETING DISPLAY

(71) Applicants: Page Barker, Dunlap, TN (US); Michael Thurman, Kennesaw, GA (US); Michael Douglas Zukowski, Signal Mountain, TN (US)

(72) Inventors: Page Barker, Dunlap, TN (US); Michael Thurman, Kennesaw, GA (US); Michael Douglas Zukowski, Signal Mountain, TN (US)

( * ) Notice: Subject to any disclaimer, the term of this patent is extended or adjusted under 35 U.S.C. 154(b) by 55 days.

(21) Appl. No.: 14/036,652

(22) Filed: Sep. 25, 2013

Related U.S. Application Data

(60) Provisional application No. 61/733,950, filed on Dec. 6, 2012, provisional application No. 61/705,814, filed on Sep. 26, 2012, provisional application No. 61/707,163, filed on Sep. 28, 2012, provisional application No. 61/707,153, filed on Sep. 28, 2012.

(51) Int. Cl.
  *G09F 13/04* (2006.01)
  *G09F 13/02* (2006.01)
  *G09F 7/18* (2006.01)

(52) U.S. Cl.
  CPC .............. *G09F 13/0409* (2013.01); *G09F 7/18* (2013.01); *G09F 13/02* (2013.01); *G09F 13/04* (2013.01)

(58) Field of Classification Search
  CPC .............. G09F 13/04; G09F 13/02; G09F 7/18
  USPC ................... 40/544, 557, 612, 556, 541, 571
  See application file for complete search history.

(56) References Cited

U.S. PATENT DOCUMENTS

| | | | |
|---|---|---|---|
| 1,700,637 A * | 1/1929 | Lamb | 160/244 |
| 4,087,785 A * | 5/1978 | Dodich | 340/908.1 |
| 4,265,039 A * | 5/1981 | Brooks | 40/603 |
| 4,866,284 A * | 9/1989 | Frankena et al. | 250/494.1 |
| 5,475,386 A * | 12/1995 | Luoma | 340/908 |
| 5,542,203 A * | 8/1996 | Luoma et al. | 40/610 |
| 6,750,829 B2 * | 6/2004 | Luoma et al. | 345/1.1 |
| 8,246,207 B2 * | 8/2012 | Chen et al. | 362/253 |
| 8,342,714 B1 * | 1/2013 | Rea | F21V 11/183 362/264 |
| 2003/0033739 A1* | 2/2003 | Tingle | G09F 13/04 40/564 |
| 2004/0093779 A1* | 5/2004 | Blach | 40/546 |
| 2008/0244944 A1* | 10/2008 | Nall et al. | 40/544 |

* cited by examiner

*Primary Examiner* — Syed A Islam
(74) *Attorney, Agent, or Firm* — Stephen J. Stark; Miller & Martin PLLC

(57) ABSTRACT

A method of advertising includes using light towers for new uses. Specifically, a skeleton may be employed to connect to a frame supporting at least one LED light from a frame connected to a mast of the light tower. The skeleton may locate a first display at a desired distance from the at least one LED light to backlight the first display. While first displays may be used with many embodiments, still other embodiments may have a second display as a vertically oriented display along a portion of the mast. The second display may deploy with the extension of mast portions for at least some embodiments.

17 Claims, 1 Drawing Sheet

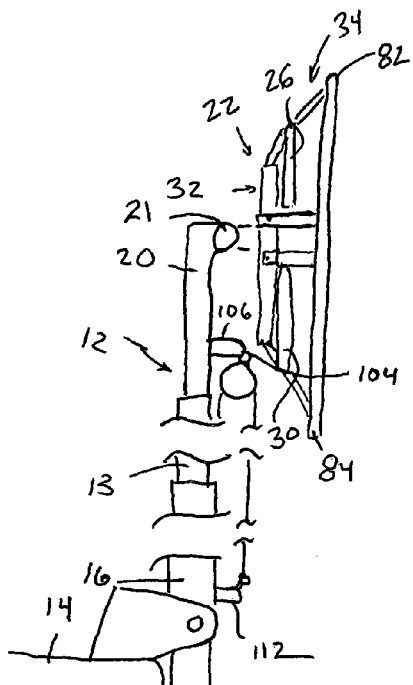
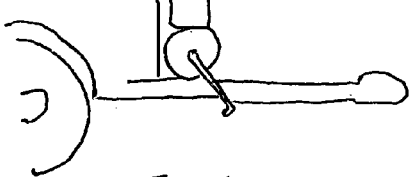
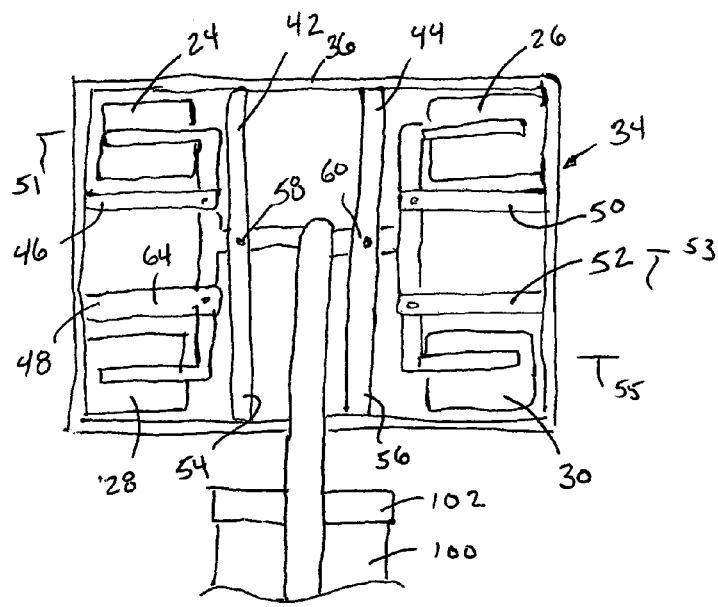
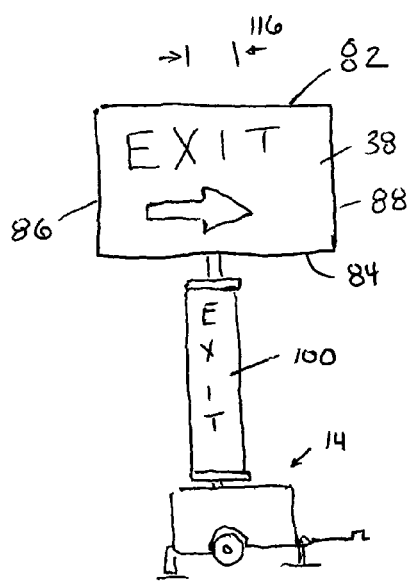
FIG. 1
FIG. 2
FIG. 3

LIGHT TOWER MARKETING DISPLAY

CLAIM OF PRIORITY

This application claims the benefit of U.S. Provisional Patent Application No. 61/733,950 filed Dec. 6, 2012, 61/705,814 filed Sep. 26, 2012, 61/707,163 filed Sep. 28, 2012 and 61/707,153 filed Sep. 28, 2012, all of which are incorporated herein by reference in their entireties.

FIELD OF THE INVENTION

The present invention relates to at least one, if not a plurality, of light tower marketing displays.

BACKGROUND OF THE INVENTION

Light towers have been around for a number of years. Many of these towers utilize high temperature lighting options. However, with the advent of LED lighting, lower temperature lights can give rise to at least one new option of advertising.

There is believed to be a need to provide at least one new advertising option for using light towers.

SUMMARY OF THE INVENTION

It is the present object of many embodiments of the present invention to provide an improved light tower marketing display.

It is another object of many embodiments of the present invention to provide an improved light tower marketing display which preferably is placed in operation when raising a mast of a light tower to at least a predetermined elevation.

It is another object of many embodiments of the present invention to provide a lighting tower display which is a backlit display which utilizes LED lights to backlight the display.

Accordingly, in accordance with a presently preferred embodiment of the present invention at least these two marketing and/or other display alternatives provide alternatives which are not previously known to the art. Specifically, a first display can be displayed with the raising of a light tower to provide a display along the mast. The mast which is normally multi-sectioned mast so as one section is raised relative to another, the display can be extended and/or otherwise displayed along at least a length of the height or elevation of the mast.

Another embodiment of the present invention relies on LED lighting which with prior art lights would not otherwise be possible to the heat generated by those lighting devices. Specifically, at least a skeleton is preferably connected to the frame supporting the lights and from the skeleton is provided a display which is preferably backlit by the LED lighting. The display itself may be one of a number of options such as for staging with the military, construction signs, advertising and/or other signs, some of which may be for a temporary nature. Others may benefit from the portability of the light tower itself, or not. Furthermore, temporary lighting such as could be had at festivals can provide a new marketing option which was previously unavailable to the festival organizers. Other marketing alternatives may also enlist for at least some party.

BRIEF DESCRIPTION OF THE DRAWINGS

The particular features and advantages of the invention as well as other objects will become apparent from the following description taken in connection with the accompanying drawings in which:

FIG. 1 is a side plan view of the presently preferred embodiment of the present invention;

FIG. 2 is a rear plan view of the light tower shown in FIG. 1; and

FIG. 3 is a front plan view of the structure shown in FIGS. 1 and 2.

DETAILED DESCRIPTION OF THE PREFERRED EMBODIMENT

FIG. 1 shows a light tower 10 having an extendable mast 12 connected to a housing 14. The extendable mast 12 may be comprised of first section 16, second section 18, and a third section 20, although fewer or more sections could be provided as a mast 12 in other embodiments.

Connected to the mast 12 is preferably a light array 22. The illustrated embodiment is a 2×2 array but other arrays or even a single light could be used for some embodiments. Lights 24,26,28 and 30 are preferably connected to a frame 32 which connects the lights 24,26,28,30 to the mast 12. Improvements to the mast 12 and lights 24,26,28,30 have been described in a copending application which may be included with this technology for various embodiments. Lights 24,26,28 and 30 are preferably LED lights which give off a minimum amount of heat particularly as compared to prior art lights which would likely be too hot to avail themselves to this technology.

At least a skeleton 34 can be connected to the frame 32. The skeleton 34 may provide a skeleton frame 36 from which a display 38 can be supported. The display 38 can be backlit by the lights 24,26,28,30 as it can be spaced by predetermined spacing 40 to ensure that the heat from the lights 24,26,28,30 does not overheat and damage the display 38 as would likely happen in prior art designs. Skeleton 34 can be comprised of one or more arms 42,44,46,48,50,52, 54,56 which can position the display 38 in a secure manner. Connectors 58,60,62,64,66,68 or otherwise may connect to the frame 32 to the skeleton 34 in various embodiments. Arms 42,44,46,48,50,52,54,56 of preferentially comprise the skeleton 34 to fasten with the skeleton frame 36. The arms 42,44,46,48,50,52,54,56 connect to the light tower 10 which supports the lights 24,26,28,30.

The display 38 may be relatively easily changed particularly for rental companies which can easily provide the skeleton 34 with the light tower 10 and then custom order or provide a stock display 38 for particular customers. Displays 38 may be secured in position with clamps such as clamps 82,84,86,88 or other technology as known by relative to the frame 36 in a secure manner preferably with an ability to withstand wind gusts up to a predetermined amount such as 65 miles per hour or otherwise.

In addition to the display 38, a second marketing option is shown in the illustrated design. A vertically oriented display 100 may be provided by providing a roll 102 into which the display 100 is normally stored in a storage configuration. The roll 102 can be connected at an upper end 104 to a mast portion such as portion 20 while another mast portion such as at shoulder 106 with connector 108 and then a second connector 110 may connect to a second shoulder 112 connected to a different mast portion 16 so that when the mast portion 20 is elevated relative to the mast portion 16, the display 100 may be deployed to a display configuration. Display 100 may be fully deployed when the mast 12 is fully deployed or it may fully deploy before that with certain embodiments. In the illustrated embodiment, the second display 100 has a width 116 of approximately 18 inches and not only can it be utilized as an identifier on display 100, it can also be used for advertising of various products as could display 38. Display 100 may extend virtually the elevation between the frame 32 and the housing 14 such as illustrated or otherwise. Some embodiments displays 100 may be deployed without extending mast segments relative to one another.

While the display 38 is preferably designed for use with LED lights, it makes no difference what kind of light tower 10 this display 100 is utilized. Although a roll style display is illustrated as would be understood by those of ordinary skill in the art related to a blind construction such as for an elementary school map design which rolls up into a roll preferably under spring tension as has been displayed. The display 100 has such construction. Alternatively, it could be more of an accordion style display but many of the displays 100 are preferably perceived for many embodiments transitioning from a storage configuration of a first height to a display configuration of a second height with the second height being at least twice as high as the storage height with the display biased towards the storage configuration. Other embodiments may not have these features. Shoulders 106, 112 are not originally provided with prior art light towers, but are preferably provided with the embodiment as shown and described herein and can relatively easily be retrofitted to existing light towers so that marketing companies or rental companies or printing companies can easily provide displays 100 for such use.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. An advertising method using a light tower with a display comprising the steps of:
   providing a light tower having a trailer with an extendable mast having a pivot at an upper end, said mast supporting at least a 1×2 array of LED lights by a frame with the pivot between the at least the 1×2 array and the trailer, and selectively connecting at least a skeleton to the frame, said skeleton extending with arms forward of the 1×2 array and supporting a first display in front of the 1×2 array to be spaced from the 1×2 array by a predetermined distance, said first display at least partially translucent and a first LED light located above a second LED light supported by the frame with each of said first and second LED lights separately and independently rotatable about elevationally spaced apart and parallel horizontal axes forward of the pivot when installed;
   backlighting the first display with the at least 1×2 array of LED lights with the first display forward of the array of LED lights.

2. The advertising method of claim 1 wherein in the providing step, the skeleton further comprises a skeleton frame defining a perimeter and the first display spans the perimeter.

3. The advertising method of claim 2 wherein in the providing step, the skeleton frame comprises arms connecting to the frame supporting the at least one LED light.

4. The advertising method of claim 2 further comprising the step of clamping the first display to the skeleton frame with clamps.

5. The advertising method of claim 1 further comprising the step of providing a vertically oriented second display connected to the mast below at the pivot.

6. The advertising method of claim 5 wherein the step of providing second display further comprises connecting the second display below the pivot to the mast at first and second shoulders defining a length therebetween, and the second display located within the length and below the array of LED lights.

7. The advertising method of claim 6 further comprising the steps of providing the second display in a storage configuration having a first height and then transitioning the second display to a display configuration having a second height with the second height being at least twice as high and extending along at least a portion of the length.

8. The advertising method of claim 7 wherein the step of providing the second display further comprising at least a portion of the second display is provided on a roll in the storage configuration with the roll raised elevationally from the storage to the display configuration.

9. The advertising method of claim 7 wherein the step of transitioning the second display to a display configuration further comprises providing the mast with first and second mast portions with the first shoulder connected to the first mast portion and the second shoulder connected to the second mast portion, and extending the first mast portion relative to the second mast portion thereby moving the first shoulder further away from the second shoulder while elevating the first display.

10. An advertising method using a light tower with a display comprising the steps of: providing a light tower with a trailer supporting an electronically adjustable mast, said mast supporting at least a 1×2 array of LED lights by a frame with a first LED light located above a second LED light supported by the frame with said LED lights each independently rotatable about separate horizontal axes relative to the frame when installed and said frame rotatable about a horizontal axis relative to the mast; and selectively extending a second display with the mast vertically above the trailer between a storage and a display configuration along the mast below the at least one LED light in a display configuration with wording on the second display obscured from view in the storage configuration with the second display located below at least a portion of the frame in the display configuration, further comprising the steps of providing said mast supporting at least a 1×2 array of LED lights by a frame with a pivot located between the frame and the first shoulder, and selectively connecting at least a skeleton to the frame supporting a first display, said first display at least partially translucent; and backlighting the first display with the array of one LED lights with the first display forward of the array of LED lights.

11. The advertising method of claim 10 further comprising the step of providing first and second shoulders defining a length therebetween, said first and second shoulders connected to opposite ends of the second display in the display configuration with the second display being within the length and the second display being within a width of the frame.

12. The advertising method of claim 11 further comprising the step of providing a storage configuration for the second display, said storage configuration providing the second display with a first height and the display configuration of the second display having a second height, with the second height being at least twice in length of the first height and further comprising the step of transitioning the second display from the storage to the display configuration while elevating the at least one LED light.

13. The advertising method of claim 12 wherein the step of transitioning the second display from the storage configuration to the display configuration further comprises unrolling at least a portion of the second display from a roll connected to the first shoulder located above the second shoulder.

14. The advertising method of claim 13 wherein the step of transitioning the second display to the display configuration further comprises providing the mast with first and second mast portions with the first shoulder connected to the first mast portion and the second shoulder connected to the second mast portion, and extending the first mast portion relative to the second mast portion thereby moving the first shoulder further away from the second shoulder.

15. The advertising method of claim 10 wherein in the providing step, the skeleton further comprises a skeleton frame defining a perimeter and the first display spans the perimeter with the pivot located between the skeleton and the first shoulder.

16. The advertising method of claim 15 wherein in the providing step, the skeleton frame comprises arms connecting to the frame supporting the at least one LED light.

17. The advertising method of claim 15 further comprising the step of clamping the first display to the skeleton frame with clamps.

* * * * *